United States Patent
Casey et al.

(10) Patent No.: US 8,509,504 B2
(45) Date of Patent: Aug. 13, 2013

(54) POINT SPREAD FUNCTION RADIAL COMPONENT IMPLEMENTATION IN JOSEPH'S FORWARD PROJECTOR

(75) Inventors: Michael E. Casey, Louisville, TN (US); Vladimir Y. Panin, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 567 days.

(21) Appl. No.: 12/561,139

(22) Filed: Sep. 16, 2009

(65) Prior Publication Data

US 2010/0067758 A1    Mar. 18, 2010

Related U.S. Application Data

(60) Provisional application No. 61/097,266, filed on Sep. 16, 2008.

(51) Int. Cl.
    *G06K 9/00*    (2006.01)
    *G06K 9/62*    (2006.01)

(52) U.S. Cl.
    USPC .......................................... 382/128; 382/132

(58) Field of Classification Search
    USPC .......................................................... 382/128
    See application file for complete search history.

(56) References Cited

U.S. PATENT DOCUMENTS 6,535,636 B1 *    3/2003    Savakis et al. ............... 382/173

OTHER PUBLICATIONS

Panin, Fully 3-D PET Reconstruction With System Matrix Derived From Point Source Measurements, Institute of Electrical and Electronics Engineers (IEEE) Transactions on Medical Imaging, vol. 25, pp. 907-921,2006.*

* cited by examiner

*Primary Examiner* — Tran Nguyen
(74) *Attorney, Agent, or Firm* — Peter Kendall

(57) ABSTRACT

Point spread function (PSF) radial filtering in a line of response space. Modeling a radial component, R, of a point spread filter as a function of at least a radial projection index $\rho$, a radial image space coordinate r, and an azimuth $\theta$. The index $\rho$ is characterized by an asymmetrical Gaussian distribution having where $\sigma$left(r) and $\sigma$right(r) derived from point source measurements, and an adjustment $\sigma_f(r, \theta)$ estimated from point source sinogram by Josephs' projector.

3 Claims, 3 Drawing Sheets

POINT SPREAD FUNCTION RADIAL COMPONENT IMPLEMENTATION IN JOSEPH'S FORWARD PROJECTOR

CROSS REFERENCE TO RELATED APPLICATIONS

The present application claims the priority benefit of U.S. Provisional Patent Application No. 61/097,266 titled "System for Image Data Processing," filed Sep. 16, 2008 (the "Provisional Application"). The complete disclosure of the Provisional Application is hereby incorporated herein by reference in its entirety.

BACKGROUND

Medical imaging is one of the most useful diagnostic tools available in modern medicine. Medical imaging allows medical personnel to non-intrusively look into a living body in order to detect and assess many types of injuries, diseases, conditions, etc. Medical imaging allows doctors and technicians to more easily and correctly make a diagnosis, decide on a treatment, prescribe medication, perform surgery or other treatments, etc.

There are medical imaging processes of many types and for many different purposes, situations, or uses. They commonly share the ability to create an image of a bodily region of a patient, and can do so non-invasively. Examples of some common medical imaging types are nuclear medical (NM) imaging such as positron emission tomography (PET) and single photon emission computed tomography (SPECT). Using these or other imaging types and associated apparatus, an image or series of images may be captured. Other devices may then be used to process the image in some fashion. Finally, a doctor or technician may read the image in order to provide a diagnosis.

A PET camera works by detecting pairs of gamma ray photons in time coincidence. The two photons arise from the annihilation of a positron and electron in the patient's body. The positrons are emitted from a radioactive isotope that has been used to label a biologically important molecule (a radiopharmaceutical). Hundreds of millions such decays occur per second in a typical clinical scan. Because the two photons arising from each annihilation travel in opposite directions, the rate of detection of such coincident pairs is proportional to the amount of emission activity, and hence the molecule, along the line connecting the two detectors at the respective points of gamma ray interaction. In a PET camera the detectors are typically arranged in rings around the patient. By considering coincidences between all appropriate pairs of these detectors, a set of projection views can be formed, each element of which represents a line integral, or sum, of the emission activity in the patient's body along a well defined path. These projections are typically organized into a data structure called a sinogram, which contains a set of plane parallel projections at uniform angular intervals around the patient. A three dimensional image of the radiopharmaceutical's distribution in the body then can be reconstructed from these data.

One particular nuclear medicine imaging technique is known as Positron Emission Tomography, or PET. PET is used to produce images for diagnosing the biochemistry or physiology of a specific organ, tumor or other metabolically active site. Measurement of the tissue concentration of a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence event, they also identify a line of response, or LOR, along which the annihilation event has occurred. An example of a PET method and apparatus is described in U.S. Pat. No. 6,858,847, which patent is incorporated herein by reference in its entirety.

After being sorted into parallel projections, the LORs defined by the coincidence events are used to reconstruct a three-dimensional distribution of the positron-emitting radionuclide within the patient. In two-dimensional PET, each 2D transverse section or "slice" of the radionuclide distribution is reconstructed independently of adjacent sections. In fully three-dimensional PET, the data are sorted into sets of LORs, where each set is parallel to a particular detector angle, and therefore represents a two dimensional parallel projection $p(s, \phi)$ of the three dimensional radionuclide distribution within the patient, where s corresponds to the distance along the imaging plane perpendicular to the scanner axis and $\phi$ corresponds to the angle of the detector plane with respect to the x axis in (x, y) coordinate space (in other words, $\phi$ corresponds to a particular LOR direction). Coincidence events are integrated or collected for each LOR and stored as a sinogram. In this format, a single fixed point in f(x,y) traces a sinusoid in the sinogram. In each sinogram, there is one row containing the LORs for a particular azimuthal angle $\phi$; each such row corresponds to a one-dimensional parallel projection of the tracer distribution at a different coordinate along the scanner axis. This is shown conceptually in FIG. 1.

A SPECT camera functions similarly to a PET camera, but detects only single photons rather than coincident pairs. For this reason, a SPECT camera must use a lead collimator with holes, placed in front of its detector panel, to pre-define the lines of response in its projection views. One or more such detector panel/collimator combinations rotates around a patient, creating a series of planar projections each element of which represents a sum of the emission activity, and hence biological tracer, along the line of response defined by the collimation. As with PET, these data can be organized into sinograms and reconstructed to form an image of the radiopharmaceutical tracer distribution in the body.

The purpose of the reconstruction process is to retrieve the spatial distribution of the radiopharmaceutical from the projection data. A conventional reconstruction step involves a process known as back-projection. In simple back-projection, an individual data sample is back-projected by setting all the image pixels along the line of response pointing to the sample to the same value. In less technical terms, a back-projection is formed by smearing each view back through the image in the direction it was originally acquired. The back-projected image is then taken as the sum of all the back-projected views. Regions where back-projection lines from different angles intersect represent areas which contain a higher concentration of radiopharmaceutical.

While back-projection is conceptually simple, it does not by itself correctly solve the reconstruction problem. A simple back-projected image is very blurry; a single point in the true image is reconstructed as a circular region that decreases in intensity away from the center. In more formal terms, the point spread function (PSF) of back-projection is circularly symmetric, and decreases as the reciprocal of its radius.

Filtered back-projection (FBP) is a technique to correct the blurring encountered in simple back-projection. Each projection view is filtered before the back-projection step to counteract the blurring point spread function. That is, each of the one-dimensional views is convolved with a one-dimensional filter kernel (e.g. a "ramp" filter) to create a set of filtered views. These filtered views are then back-projected to provide the reconstructed image, a close approximation to the "correct" image.

The inherent randomness of radioactive decay and other processes involved in generating nuclear medical image data results in unavoidable statistical fluctuations (noise) in PET or SPECT data. This is a fundamental problem in clinical imaging that is dealt with through some form of smoothing of the data. In FBP this is usually accomplished by modifying the filter kernel used in the filtering step by applying a low-pass windowing function to it. This results in a spatially uniform, shift-invariant smoothing of the image that reduces noise, but may also degrade the spatial resolution of the image. A disadvantage of this approach is that the amount of smoothing is the same everywhere in the image although the noise is not. Certain regions, e.g. where activity and detected counts are higher, may have relatively less noise and thus require less smoothing than others. Standard windowed FBP cannot adapt to this aspect of the data.

There are several alternatives to FBP for reconstructing nuclear medical data. In fact, most clinical reconstruction of PET images is now based on some variant of regularized maximum likelihood (RML) estimation because of the remarkable effectiveness of such algorithms in reducing image noise compared to FBP. In a sense, RML's effectiveness stems from its ability to produce a statistically weighted localized smoothing of an image. These algorithms have some drawbacks however: they are relatively expensive because they must be computed iteratively; they generally result in poorly characterized, noise dependent, image bias, particularly when regularized by premature stopping (unconverged); and the statistical properties of their image noise are difficult to determine.

In a class of algorithms for calculating projections known as the Square Pixel Method, the basic assumption is that the object considered truly consists of an array of N×N square pixels, with the image function f(x, y) assumed to be constant over the domain of each pixel. The method proceeds by evaluating the length of intersection of each ray with each pixel, and multiplying the value of the pixel (S).

The major problem of this method is the unrealistic discontinuity of the model. This is especially apparent for rays whose direction is exactly horizontal or vertical, so that relatively large jumps occur in S values as the rays cross pixel boundaries.

A second class of algorithms for calculating projections is the forward projection method. This method is literally the adjoint of the process of "back projection" of the FBP reconstruction algorithm. The major criticism of this algorithm is that the spatial resolution of the reprojection is lessened by the finite spacing between rays. Furthermore, increasing the number of pixels does not contribute to a reduction in this spacing, but does greatly increase processing time.

A third algorithm for calculating projections based on line-integral approximation, developed by Peter M. Joseph and described in the paper entitled An Improved Algorithm for Reprojecting Rays Through Pixel Images, IEEE Transactions on Medical Imaging, Vol. MI-1, No. 3, pp. 192-196, November 1982 (hereinafter, "Joseph's Method"), incorporated by reference herein in its entirety, is similar to the structure of the square pixel method. Each given ray K is specified exactly as a straight line. The basic assumption is that the image is a smooth function of x and y sampled on the grid of positions. The line integral desired is related to an integral over either x or y depending on whether the ray's direction lies closer to the x or y axis. While this algorithm produces a much clearer image than the other two methods, it is slower than either method, especially when interpolating oblique segments. When interpolating oblique segments, an interpolation is required in both the transaxial and axial directions for each ray, further slowing the process.

FIG. 2 presents the basic ideas behind Joseph's method. For a given row y in the image, each projection in the 2D segment, e.g., 210, receive contributions from the two nearest voxels. The interpolation coefficients are defined by the distance between the centers of the two voxels and the point where the projection (ray) intersects the horizontal line, passing through the center of the two voxels. Note that each projection ray has different interpolation coefficients, since the distance between ray intersection points ($1/\cos \theta$) is not equal to the distance between voxel centers.

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

Commonly resolution recovery methods are implemented using pixel driven approach in forward projection. Such method excludes any interpolation between voxel values, preserving original system response from point source. The computational disadvantage of such methods is computing relation of particular voxel and projection data before reconstruction. This results in significant storage of system matrix components even after taking into account symmetries.

Another way to implement resolution recovery method is use of very efficient line integral projectors, which computes projection on-the-fly. Then system response can be implemented as filtering either in projection or image space. While this approach does not require system matrix storage, the method performs interpolation between voxel values to compute LOR projection value. Such interpolation depends on projection view.

A radial component PSF filter can take into account additional image space interpolation blur. PSF filter depends on azimuthal coordinate. Basic parameters for PSF filters can be derived from data collected in the NM system using a point source, e.g., as described in "Fully 3-D PET Reconstruction With System Matrix Derived From Point Source Measurements," V Y Panin et al., Institute of Electrical and Electronics Engineers (IEEE) Transactions on Medical Imaging, vol. 25, ppg. 907-921, 2006—hereby incorporated herein in its entirety by reference (hereinafter "PANIN").

Figure 1:
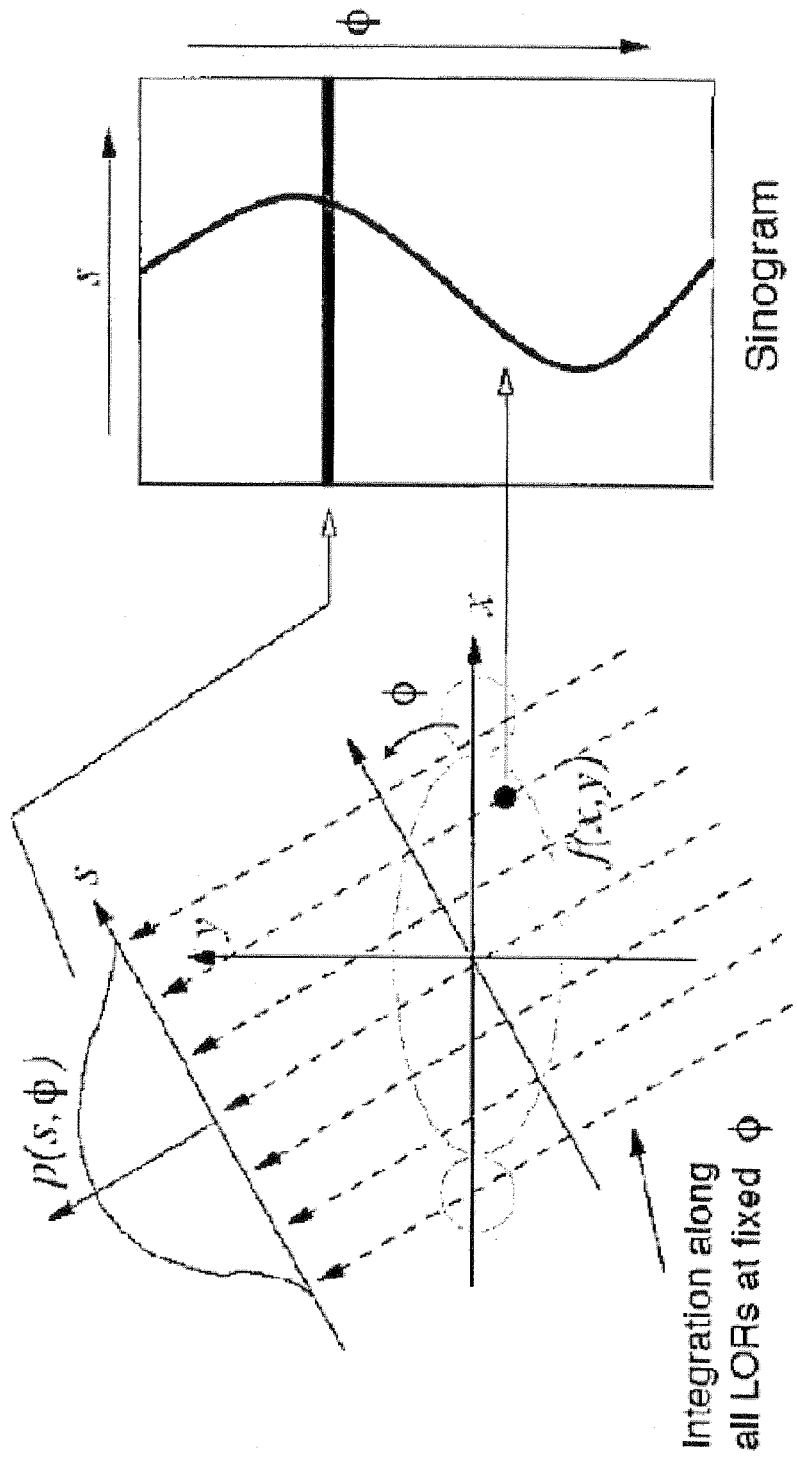
FIG. 1 illustrates derivation of a sinogram from lines of response.
Figure 2:
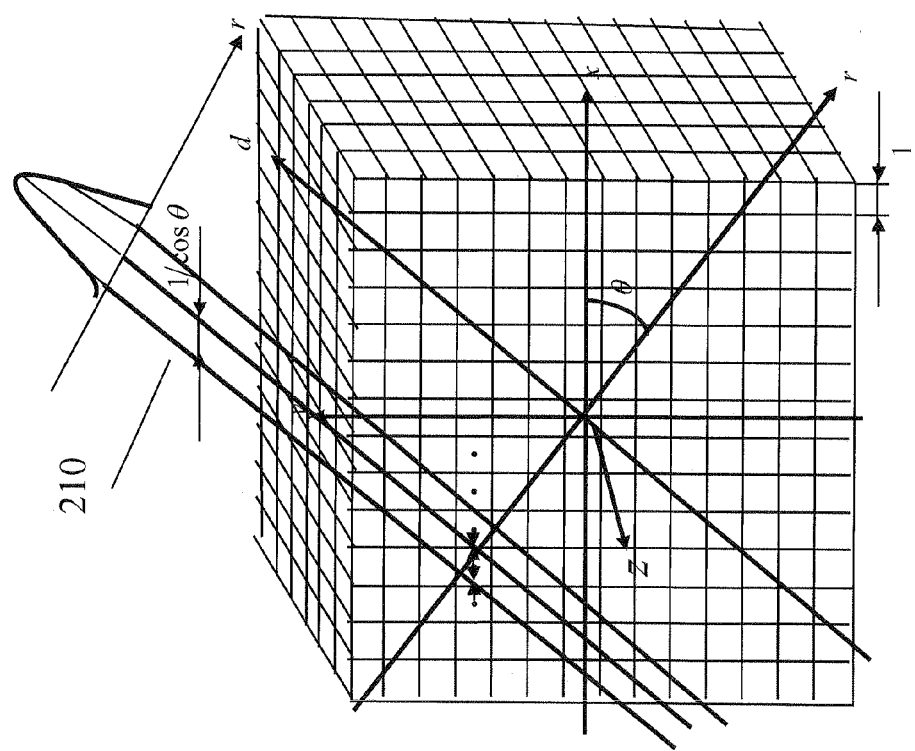
FIG. 2 illustrates Joseph's method.
Figure 3:
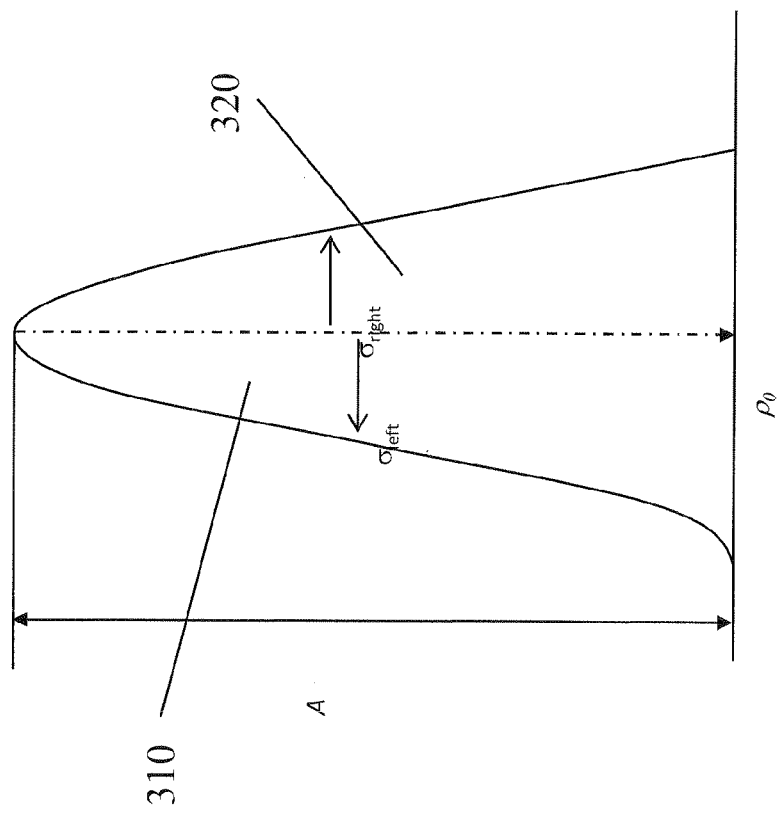
FIG. 3 illustrates an asymmetrical Gaussian distribution of p.

In such an approach to characterizing NM system response, data is collected for a point source, e.g., a $^{68}$Ge point source with a diameter of 0.5 mm and an activity of 100 μCi. The point source can be positioned within the NM system using a 3D positioning robot, e.g., with minimum step along each of three orthogonal axis of 0.01 mm. NM system symmetry can be leverage in this process by collecting data within a volume that corresponds to a symmetric unit, e.g. one block of a transverse plane. Collected data can be normalized, including with respect to geometrical and crystal components. The PSF model can be separated into two components: radial and axial. Radial component represents mostly depth-of-interaction blurring. This component is implemented as filtering in LOR space. Initially, the radial component can be assumed to be an asymmetrical function with the maximum of response in projection space at coordinate $\rho_0$ and combined from two half-Gaussian functions, as shown in FIG. 3. "Left" 310 and "right" 320 Gaussian functions differ in their standard deviations.

Since the radial component should account for additional interpolation caused by Joseph's method, the standard deviation of Gaussian function can be lowered in value, comparing with experimentally derived one. Change in this parameter is projection view dependent, due to such dependency in shear interpolation.

The PSF function for a given radial image space r coordinate of LOR and azimuthal θ can be expressed as:

$$R(\rho; r, \theta) = \exp\left(-\frac{(\rho - \rho_0(r))^2}{2\sigma_\rho^2(\rho; r, \theta)}\right), \quad (1)$$

where $$\sigma_\rho(\rho) = \begin{cases} \sqrt{\sigma_{left}^2(r) - \sigma_J^2(r, \theta)}, & \rho < \rho_0(r) \\ \sqrt{\sigma_{right}^2(r) - \sigma_J^2(r, \theta)}, & \rho \geq \rho_0(r). \end{cases} \quad (2)$$

Here projection data in is parameterized by a projection radial index p and an azimuthal angle index θ. The parameter $\sigma_{left}(r)$ and $\sigma_{right}(r)$ are derived from point source measurements as described in PANIN. Parameter $\sigma_J(r, \theta)$ can be estimated from point source sinogram simulation by Josephs' projector. At θ=0, this parameter has the smallest values. At the θ=45°, where Joseph's method interpolation is the most prominent, parameter will have the largest values.

NM systems can take the form of hardware and software elements. In some embodiments, the technology is implemented in a NM system in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. Both processors and program code for implementing each as aspect of the technology can be centralized or distributed (or a combination thereof) as known to those skilled in the art.

An NM data processing system suitable for storing program code and for executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. In a nuclear medicine (NM) imaging system, a method performed by a hardware processor for point spread function radial filtering in a line of response space, the method comprising:

modeling, utilizing a hardware processor, a radial component, R, of a point spread filter as a function of at least a radial projection index ρ, a radial image space coordinate r, and an azimuth θ as:

$$R(\rho; r, \theta) = \exp\left(-\frac{(\rho - \rho_0(r))^2}{2\sigma_\rho^2(\rho; r, \theta)}\right)$$

where:

$$\sigma_\rho(\rho) = \begin{cases} \sqrt{\sigma_{left}^2(r) - \sigma_J^2(r, \theta)}, & \rho < \rho_0(r) \\ \sqrt{\sigma_{right}^2(r) - \sigma_J^2(r, \theta)}, & \rho \geq \rho_0(r), \end{cases}$$

where $\sigma_{left}(r)$ and $\sigma_{right}(r)$ are derived from point source measurements, where $\sigma_J(r, \theta)$ is estimated from point source sinogram by Josephs' projector, wherein when θ=0, $\sigma_J(r, \theta)$ has a smallest values, and when θ=45°, $\sigma_J(r, \theta)$ has a largest values, so that the radial component R is dependent on the azimuth θ, and reconstructing a nuclear image using the radial component.

2. A nuclear medicine imaging system, including a hardware processor, comprising:

a point spread function filter comprising a radial component, R, as a function of at least a radial projection index ρ, a radial image space coordinate r, and an azimuth θ as:

$$R(\rho; r, \theta) = \exp\left(-\frac{(\rho - \rho_0(r))^2}{2\sigma_\rho^2(\rho; r, \theta)}\right)$$

where:

$$\sigma_\rho(\rho) = \begin{cases} \sqrt{\sigma_{left}^2(r) - \sigma_J^2(r, \theta)}, & \rho < \rho_0(r) \\ \sqrt{\sigma_{right}^2(r) - \sigma_J^2(r, \theta)}, & \rho \geq \rho_0(r), \end{cases}$$

where $\sigma_{left}(r)$ and $\sigma_{right}(r)$ are derived from point source measurements, where $\sigma_J(r, \theta)$ is estimated from point source sinogram by Josephs' projector, wherein when $\theta=0$, $\sigma_J(r, \theta)$ has a smallest values, and when $\theta=45°$, $\sigma_J(r, \theta)$ has a largest values, so that the radial component R is dependent on the azimuth $\theta$, and reconstructing a nuclear image using the radial component.

3. In a nuclear medicine (NM) imaging system comprising a data processing system, a computer program product for point spread function radial filtering in a line of response space, the system comprising:

a non-transitory computer-readable recording medium for storing a computer program that executed on a computer, the program comprising the steps of:

modeling a radial component, R, of a point spread filter as a function of at least a radial projection index $\rho$, a radial image space coordinate r, and an azimuth $\theta$ as:

$$R(\rho; r, \theta) = \exp\left(-\frac{(\rho - \rho_0(r))^2}{2\sigma_\rho^2(\rho; r, \theta)}\right)$$

where:

$$\sigma_\rho(\rho) = \begin{cases} \sqrt{\sigma_{left}^2(r) - \sigma_J^2(r, \theta)}, & \rho < \rho_0(r) \\ \sqrt{\sigma_{right}^2(r) - \sigma_J^2(r, \theta)}, & \rho \geq \rho_0(r), \end{cases}$$

where $\sigma_{left}(r)$ and $\sigma_{right}(r)$ are derived from point source measurements, where $\sigma_J(r, \theta)$ is estimated from point source sinogram by Josephs' projector, wherein when $\theta=0$, $\sigma_J(r, \theta)$ has a smallest values, and when $\theta=45°$, $\sigma_J(r, \theta)$ has a largest values, so that the radial component R is dependent on the azimuth $\theta$, and reconstructing a nuclear image using the radial component.

* * * * *